F. A. HUDSON.
ATTACHMENT FOR LAWN MOWERS.
APPLICATION FILED JULY 11, 1911.
1,025,271.
Patented May 7, 1912.
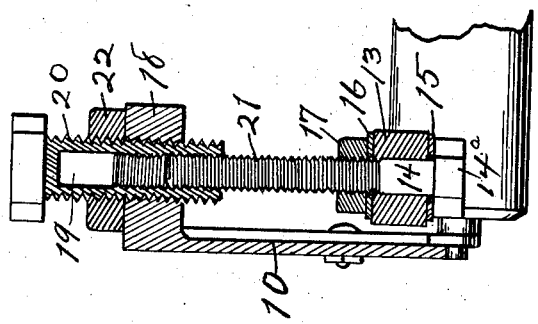
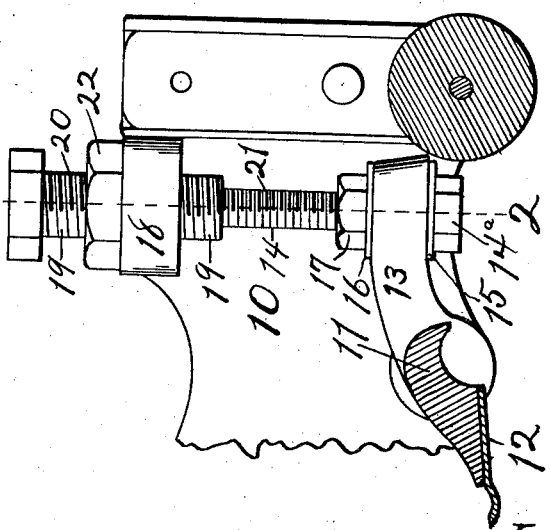
Attest:
F. D. Thompson
Earl M. Sinclair
Inventor:
Fred A. Hudson.
By Sweet Atty

UNITED STATES PATENT OFFICE.

FRED A. HUDSON, OF CLARINDA, IOWA, ASSIGNOR TO CLARINDA LAWN MOWER COMPANY, OF CLARINDA, IOWA, A CORPORATION OF IOWA.

ATTACHMENT FOR LAWN-MOWERS.

1,025,271.   Specification of Letters Patent.   Patented May 7, 1912.

Application filed July 11, 1911. Serial No. 637,959.

*To all whom it may concern:*

Be it known that I, FRED A. HUDSON, citizen of the United States of America, and resident of Clarinda, Page county, Iowa, have invented a new and useful Attachment for Lawn-Mowers, of which the following is a specification.

The object of this invention is to provide improved means for adjusting one member relative to another.

A further object of this invention is to provide improved means for increasing the delicacy and fineness of adjustment of one member relative to another.

A further object of this invention is to provide means for locking adjusted parts relative to each other without disturbing the adjustment thereof.

My invention consists in the construction, arrangement and combination of elements hereinafter set forth, pointed out in my claims and illustrated by the accompanying drawing, in which—

Figure 1 is a detail elevation, partly in section, illustrating the application of my improved device to members adjustably connected. Fig. 2 is a cross-section on the indicated line 2—2 of Fig. 1.

In the construction of the device and its application as shown the numeral 10 designates a fixed member which may be the frame of a lawn mower, and 11 designates an oscillating member, such as a ledger plate, which is pivoted to the fixed member 10 and may be a part of a lawn mower and carry a ledger blade 12. Assuming the parts 10, 11 to be elements of a lawn mower as suggested, it is desirable to provide means for adjusting the cutting edge of the blade 12 relative to the cutter reel or rotary cutter (not shown), and to this end arms or ears 13, one of which is shown in Fig. 1, are fixed to or formed on and extend rearwardly from the oscillating plate 11. As the ears and adjusting devices are identical at both ends of the plate 11, one only of them is illustrated and described. The arm 13 is vertically apertured in its extremity and a bolt 14, having a head 14ª, is mounted through said aperture and carries washers 15, 16 below and above and in contact with said arm. A locking nut 17 is screwed on the bolt 14 and in contact with the washer 16 and rigidly locks the bolt in the arm 13. The aperture in the ear or arm 13 preferably is not threaded. An ear 18 is formed on the fixed member 10 and is apertured in register with the aperture in the arm or ear 13. The aperture in the ear 18 preferably is of larger diameter than the aperture in the arm 13 and is threaded. A socket bolt 19 is screwed through the aperture in the ear 18. The external threads 20 on the socket bolt 19 have greater pitch than the external threads 21 on the bolt 14, while the internal threads of the socket bolt match with and are adapted to be screwed on said external threads 21. A locking nut 22 is screwed on the socket bolt 19 and is adapted to engage the upper surface of the ear 18 and lock said socket bolt in any position in which it may be adjusted manually.

In practical use the cutting edge of the blade 12 may be moved downwardly by upward movement of the socket bolt 19 and such downward movement of the cutting edge is relatively less than the upward movement of the bolt for the reason that said bolt travels faster in its seat than the bolt 14 travels in the socket because of the difference in pitch of the threads of the respective bolts. Such movement results in a separation of the cutting edge of the blade 12 from the reel. Opposite adjustment to approach the cutting edge of the blade 12 closer to the reel is effected by downward movement of the socket bolt 19 through its seat, such downward movement of the socket bolt effecting a lesser downward movement of the bolt 14 and arm 13 because of the difference in pitch of the screws 20 and 21. It is to be understood that the locking nut 22 is released from the ear 18 prior to either adjustment of the socket bolt 19.

I claim as my invention—

1. In a device of the class described, a fixed member formed with an ear having a screw seat, an oscillating member pivoted to the fixed member and formed with an apertured arm, a bolt mounted through the apertured arm, a locking nut connecting said bolt to said arm, a socket bolt screwed through the seat of the ear and adapted to be screwed on the first bolt, the pitch of the screw connection between the socket bolt and ear being greater than the pitch of the screw connection between the bolts, and a locking nut on the socket bolt adapted to engage said ear.

2. An attachment for lawn mowers, comprising an apertured supporting device formed with internal threads, a ledger plate formed with an arm, which arm is apertured in its extremity in register with the aperture of the supporting device, a bolt mounted through the aperture in the arm, a socket bolt screwed through the aperture of the supporting device and adapted to be screwed on the first bolt, the pitch of the screw connection between the socket bolt and supporting device being greater than the screw connection between the bolts, and a locking nut on the socket bolt.

3. An adjusting attachment for lawn mowers, comprising a rigid support, a ledger plate pivoted on said support, a bolt rigidly mounted on the ledger plate, and a socket bolt screwed through the rigid support and screwed on the first bolt, the pitch of the screw connection between the socket bolt and rigid support being greater than the pitch of the screw connection between the bolts.

Signed by me at Clarinda, Iowa, this 3rd day of July, 1911.

FRED A. HUDSON.

Witnesses:
   CHAS. TUNNICLIFFE,
   C. W. BISBEE.